US008874663B2

(12) United States Patent
Stein (10) Patent No.: US 8,874,663 B2
(45) Date of Patent: Oct. 28, 2014

(54) COMPARING SIMILARITY BETWEEN DOCUMENTS FOR FILTERING UNWANTED DOCUMENTS (75) Inventor: Christopher A. Stein, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 1137 days.

(21) Appl. No.: 12/550,052

(22) Filed: Aug. 28, 2009

(65) Prior Publication Data

US 2011/0055332 A1 Mar. 3, 2011

(51) Int. Cl.
*G06F 15/16* (2006.01)
*H04L 12/58* (2006.01)
*G06F 17/30* (2006.01)
*G06Q 10/10* (2012.01)

(52) U.S. Cl.
CPC .......... *G06F 17/30675* (2013.01); *H04L 51/12* (2013.01); *H04L 12/585* (2013.01); *G06Q 10/107* (2013.01)
USPC ........... 709/206; 709/203; 709/204; 709/205; 709/207

(58) Field of Classification Search
CPC ....... G06Q 10/107; H04L 51/12; H04H 20/20
USPC .................................................. 709/203–207
See application file for complete search history.

(56) References Cited

U.S. PATENT DOCUMENTS

| | | | | |
|---|---|---|---|---|
| 5,418,951 A * | 5/1995 | Damashek | ............................. | 1/1 |
| 5,528,701 A * | 6/1996 | Aref | ............................... | 382/178 |
| 5,909,677 A * | 6/1999 | Broder et al. | ......................... | 1/1 |
| 6,144,934 A * | 11/2000 | Stockwell et al. | ................. | 704/1 |
| 6,505,206 B1 * | 1/2003 | Tikkanen et al. | .............. | 707/797 |
| 6,654,787 B1 * | 11/2003 | Aronson et al. | ............... | 709/206 |
| 6,662,180 B1 * | 12/2003 | Aref et al. | .............................. | 1/1 |
| 6,990,628 B1 * | 1/2006 | Palmer et al. | .................. | 715/234 |
| 7,117,358 B2 * | 10/2006 | Bandini et al. | ................. | 713/153 |
| 7,146,354 B1 * | 12/2006 | Tennican et al. | ....................... | 1/1 |
| 7,555,523 B1 * | 6/2009 | Hartmann | ..................... | 709/206 |
| 7,617,526 B2 * | 11/2009 | Davis et al. | ..................... | 726/11 |
| 7,734,627 B1 * | 6/2010 | Tong | .............................. | 707/737 |
| 7,747,642 B2 * | 6/2010 | Ren et al. | ....................... | 707/780 |
| 7,853,654 B2 * | 12/2010 | Yamazaki et al. | ............ | 709/206 |
| 7,912,907 B1 * | 3/2011 | Mantel et al. | .................. | 709/206 |
| 8,204,945 B2 * | 6/2012 | Milliken et al. | ............... | 709/206 |
| 8,275,842 B2 * | 9/2012 | Ngan | ............................. | 709/206 |
| 2003/0187942 A1 * | 10/2003 | Quine et al. | ................... | 709/207 |
| 2003/0200211 A1 * | 10/2003 | Tada et al. | .......................... | 707/5 |

(Continued)

OTHER PUBLICATIONS

Broder, "Identifying and Filtering Near-Duplicate Documents", 2000, retrieved from <http://www.cs.brown.edu/courses/csci2531/papers/nearduplicate.pdf>.*

(Continued)

*Primary Examiner* — Emmanuel L Moise
*Assistant Examiner* — Sarah Drabik
(74) *Attorney, Agent, or Firm* — Fenwick & West LLP (57) ABSTRACT

A mechanism for efficiently determining similarity between documents. A set of reference data items is generated by processing a reference document. A similarity index representing similarity between a candidate document and the reference documents is obtained by counting segments of the candidate document matching the reference data items. The candidate document is a message transmitted in a communication system where the message is compared against one or more reference documents representing unwanted messages to filter and block unwanted messages from being transmittal or propagated.

19 Claims, 6 Drawing Sheets

(56) References Cited

U.S. PATENT DOCUMENTS

| | | |
|---|---|---|
| 2004/0177110 A1* | 9/2004 | Rounthwaite et al. ........ 709/202 |
| 2005/0027679 A1* | 2/2005 | Sample ............................. 707/1 |
| 2005/0060643 A1* | 3/2005 | Glass et al. ................ 715/501.1 |
| 2005/0108340 A1* | 5/2005 | Gleeson et al. ............... 709/206 |
| 2006/0075048 A1* | 4/2006 | Gruper et al. ................. 709/206 |
| 2006/0149820 A1* | 7/2006 | Rajan et al. ................... 709/206 |
| 2008/0059590 A1* | 3/2008 | Sarafijanovic et al. ....... 709/206 |
| 2008/0219495 A1* | 9/2008 | Hulten et al. ................. 382/100 |
| 2009/0100006 A1* | 4/2009 | Kawai et al. ...................... 707/2 |
| 2010/0017397 A1* | 1/2010 | Koyanagi et al. ................. 707/5 |

OTHER PUBLICATIONS

Tran, T., "Inside Yahoo! Generator," CS224N Final Project, Stanford University, Jun. 6, 2002, 12 Pages.

\* cited by examiner

COMPARING SIMILARITY BETWEEN DOCUMENTS FOR FILTERING UNWANTED DOCUMENTS

BACKGROUND

This invention relates to comparing similarity between documents including a string of characters. More particularly, this invention relates to determining whether two documents are similar.

Similarity between documents may be determined for various purposes and applications. For example, the similarity between documents may be determined to filter unwanted documents, to remove similar search entries in a search engine, and to search for similar files in a file system. Taking an example of filtering unwanted messages, similarity between a reference document and messages may be determined to filter or prevent propagation of documents similar to a reference document in a communication system. Unwanted messages include, for example, malicious messages. Malicious messages have evolved from a mere nuisance to instruments for committing fraud or other illegal activities. Such malicious messages include spam emails. These Internet "junk mails" take up valuable memory space on servers and other computational resources while consuming recipients' time and/or resource for their removal. The majority of spam messages are commercial advertising, although chain letters, political mailings, and other forms of non-commercial mailings are also classified as junk mails. Other malicious messages may pose more serious threat to the recipients. For example, emails or other forms of messages may be employed in illegal activities such as phishing and spoofing to extract sensitive information from the recipients.

Online messaging services such as social network services are especially vulnerable to unwanted messages because users place trust on messages sent by other users having previous social relationship with the users. To facilitate interactions between users, the online messaging services often provide effective and convenient mechanism to interchange messages between users. Such mechanisms include, among others, instant messenger (IM) services, email services, blog services, posting and commenting on posts, and other communication mechanisms. These mechanisms may also function as means to propagate malicious emails and messages to many users in a short amount of time.

Filtering of unwanted messages may be complicated by the fact that unwanted messages evolve over time as the messages propagate to other users. Each time a user accesses the unwanted messages, the user may add comments or revise the messages before sending the messages to another recipient. Moreover, the sender of the unwanted messages may intentionally vary messages transmitted to senders to avoid detection and filtering of the unwanted messages. Such variations in the unwanted messages make it difficult to detect and filter unwanted messages.

SUMMARY

Embodiments of the invention use document matching techniques for determining similarity between a candidate document and a reference document by processing the reference document into reference data items. The candidate document is processed into document data items and compared with reference data items to generate similarity indices. A count of document data items matching the reference data items is computed. Based on the count, a similarity index representing the similarity between the candidate document and the reference document is computed.

In one embodiment, a reference document is processed into a set of reference data items by segmenting the reference document into shingles of a predetermined length. The location of the segmentation is shifted one or more times to obtain different sets of shingles from the reference document. The set of reference data items may be stored in trie data structures for fast access.

In one embodiment, the candidate document is segmented into document data items, where each message data item is a shingle of a predetermined length. The location of the segmentation is shifted one or more times to obtain different sets of shingles from the candidate document.

In one embodiment, the system may adapt over time so that a set of reference data items for a reference document is removed from the active sets of reference documents in time and/or as the system finds fewer matches with that reference document. For example, the frequency that the similarity index for the reference document exceeds the threshold may be tracked for a plurality of candidate documents. If the frequency remains above a frequency threshold, all the documents are compared with the reference document. If the frequency drops below the frequency threshold, selected candidate documents are compared with the reference document.

DETAILED DESCRIPTION

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

Embodiments provide a mechanism for efficiently determining similarity between documents. A set of reference data items is generated by processing a reference document. A similarity index representing similarity between a candidate document and the reference documents is obtained by counting segments of the candidate document matching the reference data items. In one embodiment, the candidate document is a message transmitted via a communication system. In this embodiment, the message is compared against one or more reference documents representing unwanted messages to filter and block unwanted messages from being transmitted or propagated.

A reference document refers to a document to be compared with a candidate document for similarity. In one embodiment, the reference document represents a message determined to be undesirable for transmittal or propagation. The reference document may be a sample of original unwanted messages or a version of the unwanted message processed to facilitate comparison with a candidate document. The reference document may include, among others, documents, spam emails, phishing messages, spoofing messages, chain messages, and advertisements.

A reference data item refers to data derived from the reference document for use in determining the similarity of a message to the reference document. In one embodiment, the reference data item is a shingle obtained by segmenting the reference document by a predetermined length. A set of reference data items are a plurality of reference data items derived from a reference document. A shingle refers to a contiguous portion of the reference document that is shorter than the entire reference document.

A candidate document is a document for comparing against one or more reference documents. The candidate document may include a message intended for transmittal or publishing via a communication system for access by a recipient. The candidate document may include, among others, documents, emails, documents, web pages, instant messages, text messages, posting and commenting on posts, feeds and streams. The candidate document may be encoded in various formats including, among others, ASCII, CP930, UTF-7, UTF-8 and UTF-16. Various non-English formats such as Shift-JIS-2004, GB2312 and EUC-KR encoding method may also be used to encode the candidate document. The number of bits in a character depends on the encoding format. For example, a character in UTF-8 format consists of 8 bits while a character in UTF-16 format consists of 16 bits. Any encoding method not involving encryption may be used to encode the candidate document.

A document data item refers to data derived from a candidate document for use in determining the similarity of the message to the reference document. In one embodiment, the document data item is a shingle obtained by segmenting the candidate document by a predetermined length.

Document Similarity Determination

To determine the similarity between a candidate document and a reference document, the reference document is segmented into reference data. A candidate document is also segmented into document data items in the same manner as the reference document. After generating the reference data items and the document data items, the total number of reference data items and the total number of document data items are determined. Further, a count representing the number of matching reference data items and the document data items is computed. Based on the count, the number of reference data items and the document data items, the similarity between the reference document and the candidate document can be computed into a similarity index.

In one embodiment, the reference data items are generated by segmenting the reference document into a shingles of a predetermined length. The starting location of segmenting is shifted to obtain additional shingles of the same predetermined length. Additional shingles for the candidate document are also obtained by segmenting the candidate document at shifted starting locations.

A candidate document may be compared with a reference document for various applications. For example, the similarity between an advertisement embedded in a website and another advertisement is determined to prevent embedding similar advertisements on the same webpage. For this purpose, a string of characters in an advertisement to appear in a webpage may be recognized using an Optical Character Recognition (OCR), and then be compared against strings of characters in other advertisements.

The comparison between documents may also be performed to prevent propagation of unwanted messages. In the following, embodiments are described primarily with reference to comparing messages received at a communication system against unwanted messages to prevent propagation of unwanted messages. In these embodiments, the messages received at the communication system correspond to the candidate documents. The documents predetermined as being unwanted correspond to the reference documents. The following embodiments, however, are merely illustrative. The similarity between documents may be determined for various other applications.

Architecture Communication System

Figure 1:
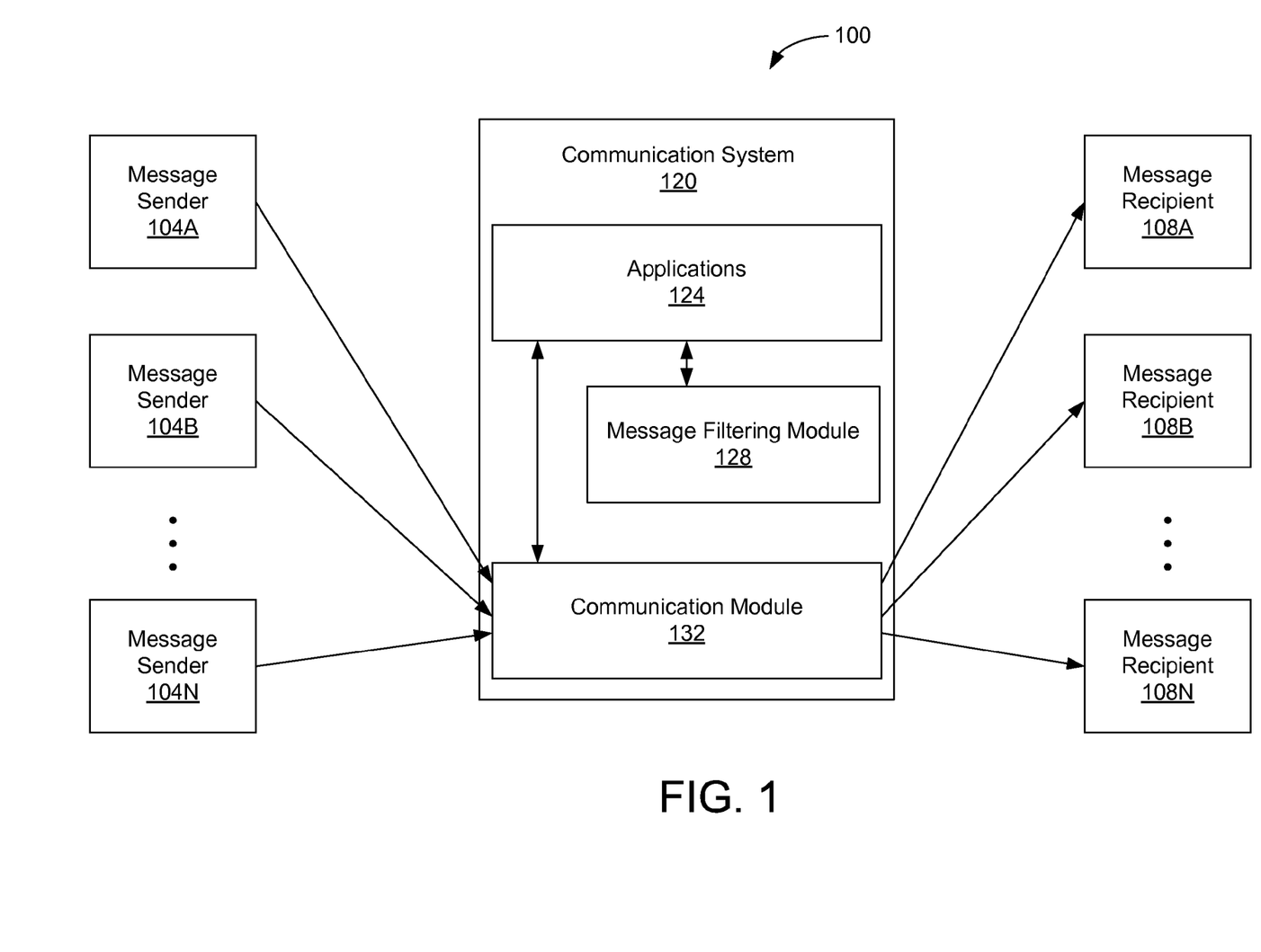
FIG. 1 is a block diagram illustrating a communication system, according to an embodiment of the present invention.

FIG. 1 is a block diagram illustrating a communication system 120 in a communication environment 100, according to an embodiment of the present invention. The communication system 120 communicates with one or more message senders 104A through 104N (hereinafter, collectively referred to as the "message senders 104") and a plurality of message recipients 108A through 108N (hereinafter, collectively referred to as the "message recipients 108"). In this embodiment, the communication system 120 employs a server-client architecture in which the communication system 120 is connected to the message senders 104 and the message recipients 108 to route or publish messages from the message senders 104. The message recipients 108 receive the messages by accessing services provided by the communication system 120.

The message senders 104 may be any types of devices capable of sending messages to one or more message recipients via the communication system 120. The message recipients 108 may be any types of devices capable of receiving messages from the message senders 104. Although the message senders 104 and the message recipients 108 are illustrated in FIG. 1 as being separate entities, the same device may become a message sender 104 or a message recipient 108 depending on its mode of operation. The message senders 104 and the message recipients 108 may include, among others, laptop computers, desktop computers, cell phones, smartphones, Personal Digital Assistants (PDA), game consoles, and set-top boxes.

The communication system 120 may include, among other components, one or more applications 124, a message filtering module 128 and a communication module 132. The communication system 120 may be part of a larger system that enables communications from the message senders 104 to the message recipients 108, such as a social networking system, a bulletin board system, or a website allowing users to post content, to name just a few examples. Content "items" represent single pieces of content that are represented as objects in the social network. The communication system 120 may instantiate communication channels to allow users of the communication system 120 to increase their interaction with each other, for example, as described in U.S. patent application Ser. No. 12/253,149 entitled "Resource Management of Social Network Applications" filed on Oct. 16, 2008, which is incorporated by reference herein in its entirety.

The communication module 132 is a combination of software, hardware, firmware or a combination thereof that allows the communication system 120 to communicate with the message senders 104 or the message recipients 108. In one embodiment, the communication module 132 allows the message sender 104 and the message recipients 108 to access the communication system 120 via the Internet. The communication module 132 may employ various wired or wireless communication methods to communicate with the message sender 104 and the message recipients 108.

The applications 124 are software, hardware, firmware or a combination thereof for decoding messages received from the message senders 104, determining the destinations of the messages, and routing the messages to the message recipients 108 or publishing the messages for access by the message recipients 108. In one embodiment, the applications 124 are coupled to the communication module 132 to receive messages from the message senders 104 and route the messages to the message recipients 108 via the communication module 132. The applications 124 may also publish messages in the form of, for example, web documents for sharing with the message recipients. The message recipients 108 may access the applications 124 to retrieve messages published by the message senders 104. Examples of the applications 124 for routing messages or sharing messages include, among others, email server systems, website hosting systems and SMS messaging system.

The message filtering module 128 is software, hardware, firmware or a combination thereof for receiving the messages decoded by the applications 124 to detect unwanted messages, as described below in detail with reference to FIG. 2. The message filtering module 128 may include sub-modules, each sub-module dedicated to detecting unwanted messages associated with certain types of messages. If the message filtering module 128 determines that a message is not similar to any unwanted messages within a predefined a predefined tolerance, the message filtering module 128 allows the applications 124 to route, publish or access the message. Conversely, if the message filtering module 128 determines that a message is similar to one or more unwanted messages within the predefined tolerance, the message filtering module 128 blocks the applications 124 from routing, publishing or granting access to the message.

Although FIG. 1 illustrates a centralized communication environment 100 where a communication system 120 routes or publishes the messages, peer-to-peer architecture or distributed network architecture may also be employed to communicate messages between a message sender and a message receiver. In the peer-to-peer architecture, the message filtering module 128 may be embodied as a component operating in conjunction with applications installed in the message sender or the message recipient to block unwanted messages from being accessed by the receiving users. In the distributed network architecture, multiple communication systems may be use to process a large amount of messages in a distributed manner.

Message Filtering Module

Figure 2:
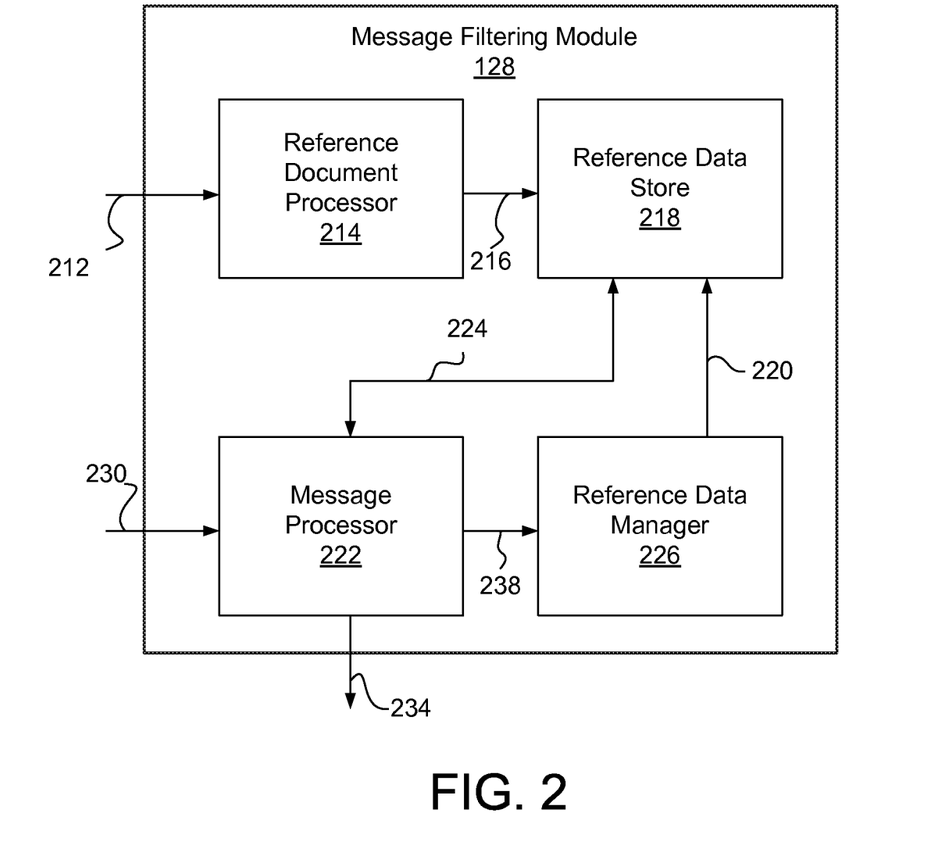
FIG. 2 is a block diagram illustrating a message filtering module, according to one embodiment of the present invention.

FIG. 2 is a block diagram illustrating a message filtering module 128, according to one embodiment. The message filtering module 128 may include, among other components, a reference document processor 214, a reference data store 218, a message processor 222 and a reference data manager 226. The reference document processor 214 is coupled to the reference data store 218 to provide a set of reference data items 216 after processing a reference document 212. The reference data store 218 is coupled to the message processor 222 to provide a set of reference data items 224 for comparison with a message 230. The reference data store 218 is also coupled to the reference data manager 226 to receive instructions 220 from the reference data manager 226. The reference data manager 226 is coupled to the message processor 222 to receive match information 238. One or more of these components may be combined into a single software, hardware, or firmware module, or a combination thereof.

The reference document processor 214 receives a reference document 212 and processes the reference document 212 into the set of reference data items 216 for storage in the reference data store 218. The reference document may be a message predetermined to be unwanted. The reference documents may be collected manually by an operator of the communication system 120, received from a third party specialized in providing filtering services, extracted using algorithms such as pattern recognition algorithm, or generated by automatic clustering algorithm or anomaly detection algorithm. The reference document processor 214 segments the reference document 212 and generates the set of reference data items 216, as described below in detail with reference to FIG. 3.

The reference data store 218 receives the set of reference data items 216 and stores the set of reference data items 216. In one embodiment, the set of reference data items 216 is stored in a trie data structure, as described below in detail with reference to FIG. 4. The trie data structure allows efficient storage and comparison of the message to the set of reference data items. The reference data store 218 is referenced by the message processor 222 to determine whether a message 230 is an unwanted message. The reference data store 218 may store multiple sets of reference data items, each set representing one reference document. In one embodiment, a set of reference data items may be generated at a module or device external to the message filtering module 128 and then stored in the reference data store 218.

The message processor 222 receives the message 230 and performs operation to determine the similarity of the message 230 to any reference documents corresponding to the sets of reference data items 216 stored in the reference data store 218. In one embodiment, the message processor 222 segments the message 230 into shingles, and compares the shingles to the sets of reference data items that may also be shingles, as described below in detail with reference to FIG. 3. The message processor 222 may generate a similarity index for each comparison between the message 230 and the set of reference data items. The similarity index indicates the degree of similarity between the message 230 and a reference document corresponding to the compared reference data set. If the similarity indices of a message for all the reference data sets are not above a threshold (i.e., the message 230 is determined as not being similar to any reference documents), the message processor 222 sends a signal 234 to approve one or more applications 124 to approve routing of the message to the message recipients 108, publishing of the message, or granting access to the message by the message recipients 108. Conversely, if the similarity index for any of the reference data sets exceeds a threshold, the message 230 is determined as an unwanted message. In response, the message processor 222 sends a signal 234 to the one or more applications 124 to block the one or more applications 124 from routing the message to the message recipients 108, publishing the message, or granting access to the message by the message recipients 108.

In one embodiment, if a message is determined to be similar to a reference document, a warning message is sent to a message sender 104 originating the message. The warning message may indicate, among others, that the message attempted for sharing or transmittal is an unwanted message and that the message was not routed, published or allowed access. In another embodiment, when it is determined that the message is determined to be similar to a reference document, a CAPTCHA (Completely Automated Public Turing test to tell Computers and Humans Apart) message may be issued and sent to the message sender 104 to confirm that the message was not machine generated. Alternatively, the message similar to the reference document may be blocked without sending any warning messages to the message sender 104.

The reference data manager 226 manages the reference data sets stored in the reference data store 218 for efficient filtering of unwanted messages. In one embodiment, the reference data manager 226 communicates with the message processor 222 to receive match information 238 indicating the set of reference data items determined to be similar to a blocked message. The reference data manager 226 tallies the number of hits based on the match information 238 for each set of reference data items, and then sends instructions 220 to the reference data store 218 to rearrange, prioritize, remove or reinstate the set of reference data items. In one embodiment, the reference data store 218 prioritizes or rearranges the set of reference data items in response to the instructions 220 so that the message processor 222 compares the messages against the set of reference data items with higher tallied hits before the sets of reference data items with lower tallied hits. When the message is determined to be similar to a set of reference data items, comparison against other sets of reference data items may be obviated. In this way, the message processor 222 can detect unwanted messages more promptly and efficiently.

In one embodiment, the message processor 222 intercepts the messages from the applications 124 or messages to the applications 124, and blocks any messages determined to be similar to unwanted messages. That is, the message processor 222 receives or sends screened messages from or to the communication module 132 instead of operating with the applications 124. This implementation is advantageous because minimal or no modification need to be made on the part of the applications 124.

In one embodiment, the messages are batch processed by the message processor 222. The message processor 222 may periodically run a cleaning session to detect and remove if any documents (e.g., blog) stored in the communication system 120 that are similar to the reference documents.

Method of Filtering Unwanted Messages

Figure 3:
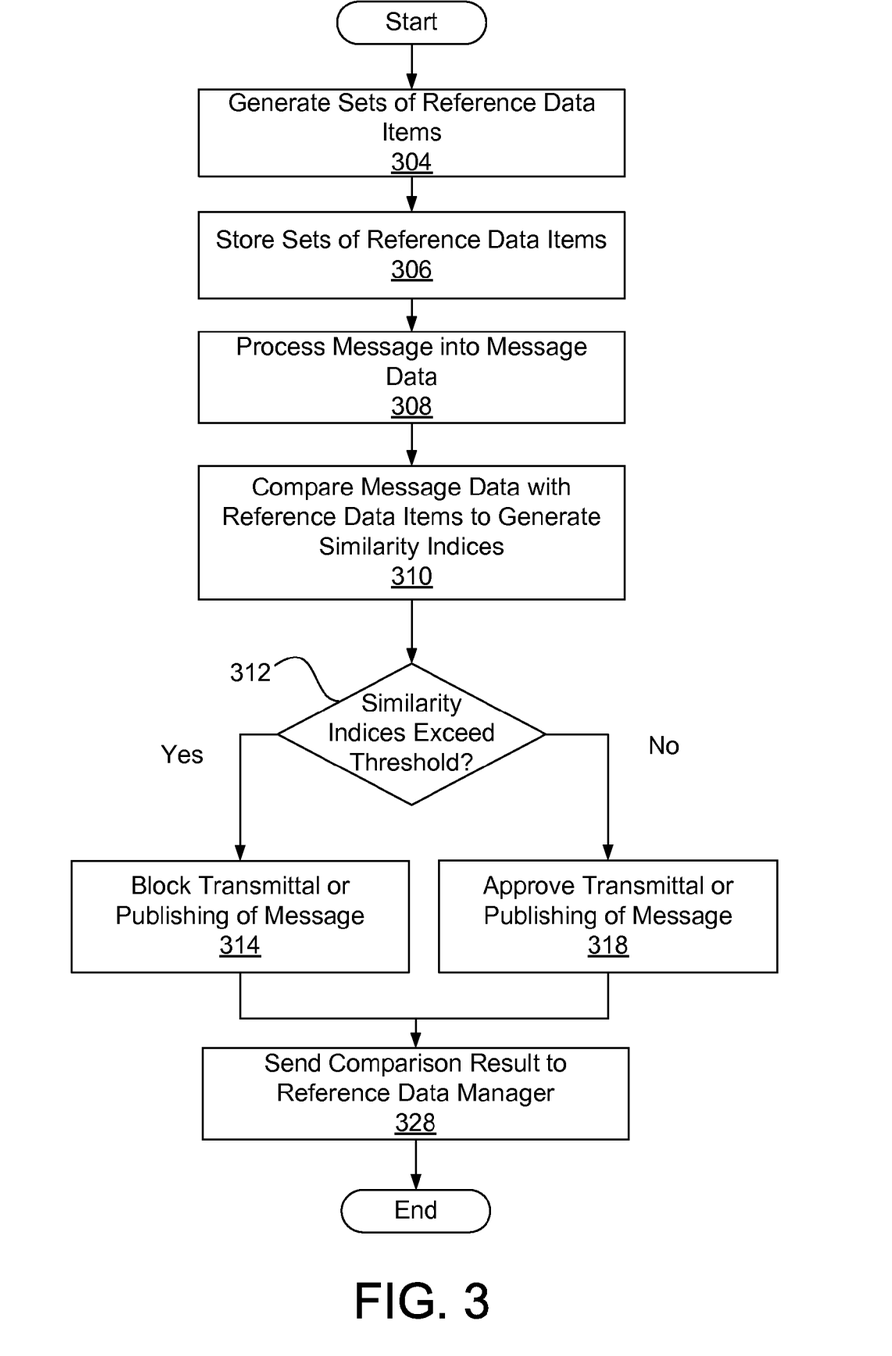
FIG. 3 is a flowchart illustrating a process for filtering messages, according to one embodiment of the present invention.

FIG. 3 is a flowchart illustrating a method of filtering messages, according to one embodiment. The sets of reference data items are generated 304 by the reference document processor 214 based on reference documents. In one embodiment, a set of reference data items consist of shingles generated according to a process described below in detail with reference to FIG. 4. The generated set of reference data items are then stored 306 in the reference data store 218.

A message received at the communication system 120 is processed 308 by the message processor 222 into document data items. In one embodiment, the document data items consist of shingles generated according to a process described below in detail with reference to FIG. 4. The message processor 222 then compares 308 the document data item with the set of reference data items to generate similarity indices, as described below in detail with reference to FIG. 7. Each similarity index represents the similarity of the message to a particular reference document.

Then it is determined 312 whether any of the similarity indices exceed a predetermined threshold. If each of the similarity indices does not exceed the threshold, the message is determined as not matching any of the reference documents. Then, the message is approved 318 for routing, publishing or access by the applications 124. Conversely, if at least one of the similarity indices exceeds the threshold, the message 230 is determined as matching a reference document corresponding to the similarity index exceeding the threshold (and thus, corresponds to an unwanted message). In this case, the message is blocked 314 from routing, publishing or access by the applications 124. In another embodiment, when it is determined that the message is determined to be similar to a reference document, a CAPTCHA message may be issued and sent to the message sender 104 to confirm that the message was not machine generated.

The result of processing and comparing of the message 230 is sent 238 to the reference data manager 226 to rearrange, prioritize, remove or reinstate sets of reference data items for comparison with the future messages. In one embodiment, the set of reference data items is reinstated as an active set of reference data item or downgraded to an inactive set of reference data item, depending on whether more or less messages are determined to be similar to the reference document.

Figure 4:
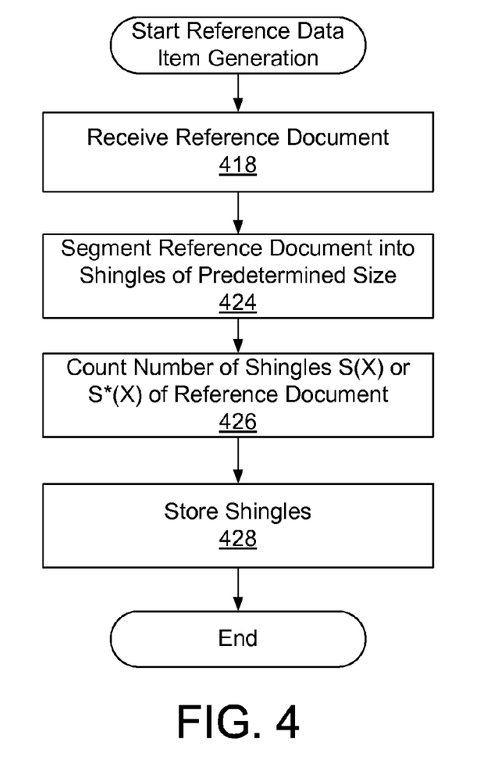
FIG. 4 is a flowchart illustrating a process for generating a set of reference data items, according to one embodiment.
Figure 5:
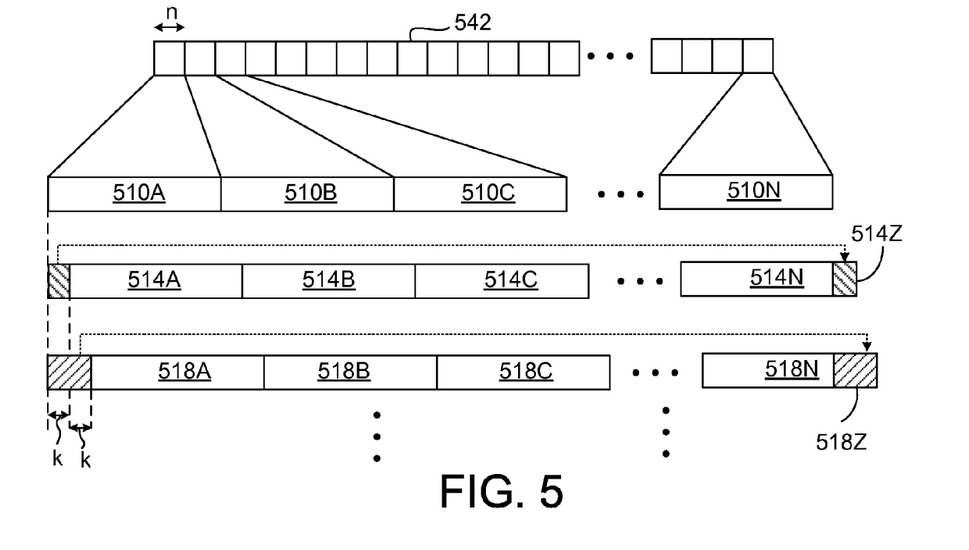
FIG. 5 is a diagram illustrating segmenting of a reference document or a message into shingles, according to one embodiment of the present invention.

FIG. 4 is a flowchart illustrating a method of generating a set or reference data items according to one embodiment. First, a reference document is received 418 at the reference document processor 214. The reference document processor 214 then segments 424 the received reference documents into shingles of a predetermined character size. Referring to FIG. 5, the reference document 542 is segmented into a first series of shingles 510A through 510N by splitting documents into n characters of data. A second series of shingles 514A through 514N is generated by segmenting the reference document 542 at character locations shifted k characters compared to the first series of shingles. The last shingle 514N in the second series of shingles is shorter than other shingles by k characters, and thus, the last shingle 514N is disregarded. A third series of shingles is similarly generated by segmenting the reference documents 542 at character locations shifted k characters compared to the second series of shingles. The last shingle 518N of the third series of shingles is shorter than other shingles by 2 k characters; and thus the last shingle 518N is disregarded. The process of shifting and segmenting the reference document are repeated (n/k−1) times to generate multiple series of shingles. In one embodiment, n is set to eight and k is set to one, resulting in a total of eight series of shingles.

The shingles according to the embodiment of FIG. 5 are generated by segmenting the reference document in the units of characters of a predetermined length and not words. Because the units are not segmented by words, reference documents in different languages may be processed in an identical manner.

Referring back to FIG. 4, the total number of shingle in the reference document 542 is counted 426 after segmenting 424 the reference document. In one embodiment, only the number of unique shingles is counted and duplicative shingles are discarded from counting. If shingles in the reference document are denoted by "X," the number of unique shingles can be expressed as S(X) where S indicates a function for counting the number of unique shingles. In another embodiment, all shingles including duplicative shingles are counted. The number of all shingles in the reference document X can be expressed S*(X) where S* indicates a function for counting the number of all shingles. Function S* differs from function S in that function S* counts duplicative shingles whereas function S does not. That is, if there are two occurrences of the same shingle in the reference document X, S(X) results in only one count for this shingle whereas S*(X) results in two counts.

The shingles are stored 428 in the reference data store 218. When storing the shingles, duplicative shingles may be removed and only unique shingles may be stored. In one embodiment, the number of duplicative shingles are counted and stored. The counts of the duplicative shingles may be used as weights assigned when determining the similarity between the message and the set of reference data items.

Figure 6:
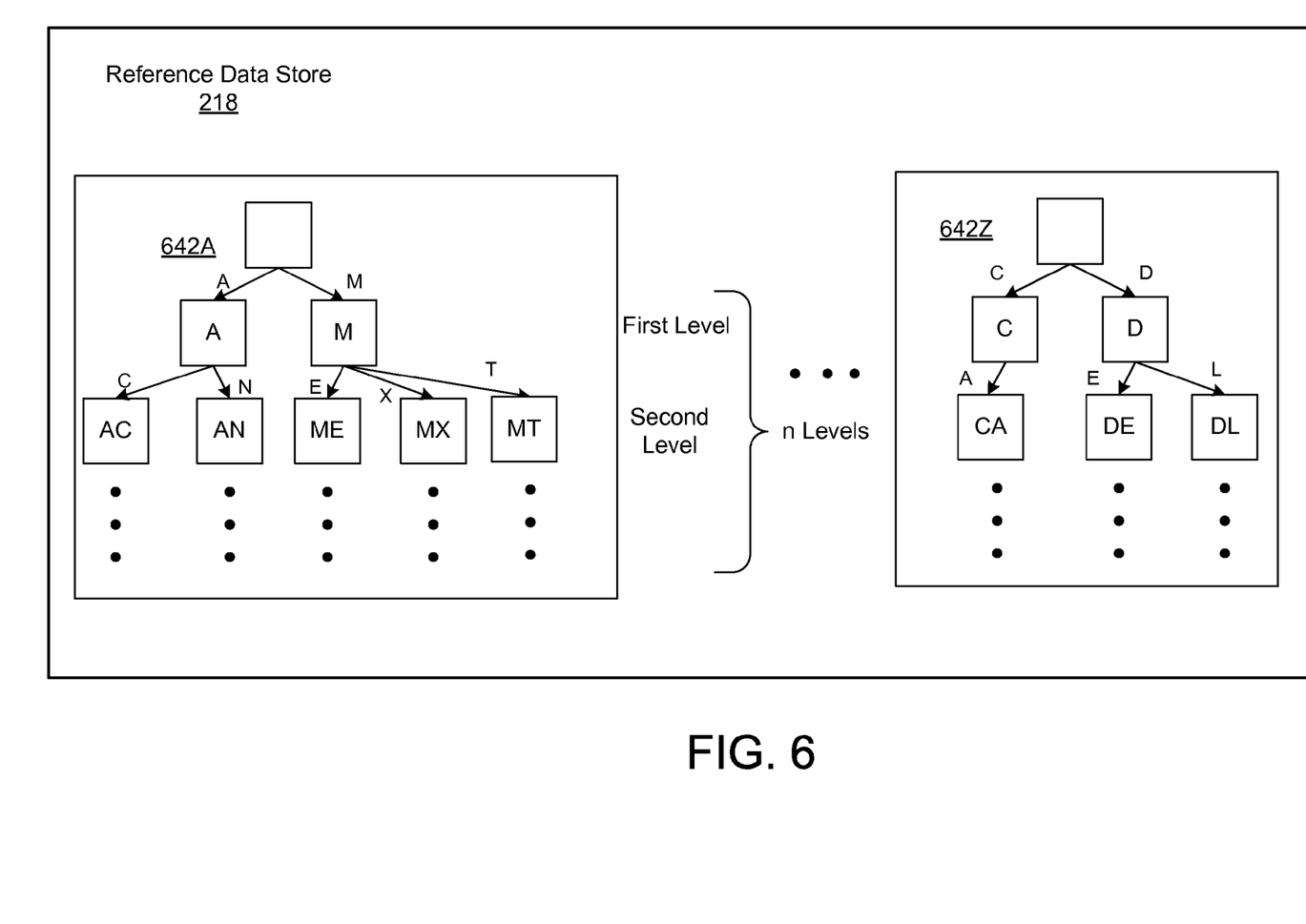
FIG. 6 is a block diagram illustrating a reference data store for storing shingles in trie data structures, according one embodiment of the present invention.

In one embodiment, the shingles derived from one reference document are stored in one trie data structure. FIG. 6 is a block diagram conceptually illustrating the reference data store 218 storing shingles in the trie data structure, according to one embodiment. Each of the trie data structures 642A through 642Z in the reference data store 218 represents one reference document. The process of generating a trie data structure is well known in the art and explanation thereof is omitted herein for the sake of brevity. The number of levels "n" in FIG. 6 corresponds to the character length of a shingle. The trie data structure allows multiple shingles to be stored efficiently using less memory. The trie data structure also allows efficient comparison between the shingles of the reference document with the shingles of the message.

In another embodiment, shingles derived from a plurality of reference documents may be stored in a single shared trie data structure to eliminate redundancy. In this case, the terminal node may indicate from which reference document the shingle was derived.

In FIG. 6, trie data structures 642A and 642Z are illustrated. All shingles in the tried data structure 642A start with a character "A" or "M" as represented by nodes at the first level. The second character appearing in the shingle after "A" may be "C" or "N" and the second character appearing after "M" is "E," "X" or "T" as represented by nodes at the second level. The nodes at lower levels of the trie structure represent characters appearing at later sequences in a shingle. The trie data structure 642Z represents shingles of another reference document where each shingle starts with "C" or "D" followed by "A," "E" or "L."

Figure 7:
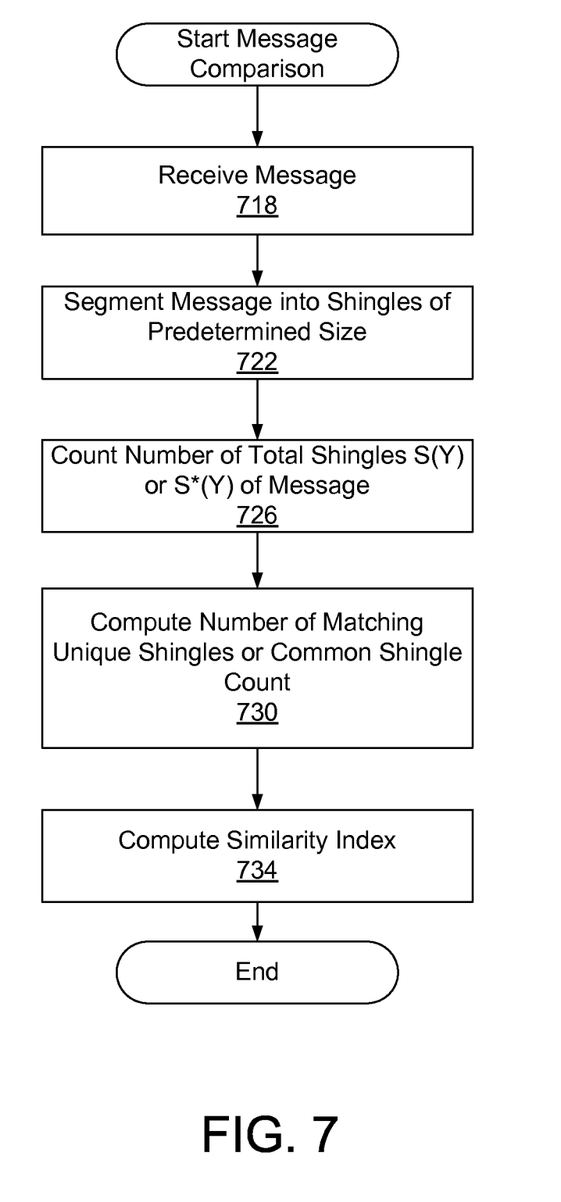
FIG. 7 is a flowchart illustrating a method of comparing a message against sets of reference data items, according to one embodiment.

FIG. 7 is a flowchart illustrating a method of comparing a message against sets of reference data items, according to one embodiment. The message 230 is received 718 at the message filtering module 128. The message filtering module 128 then segments 722 the message 230 at different character locations to generate shingles of a predetermined size. In one embodiment, the shingles of the message are generated in the same manner as the set of reference data items, as described above in detail with reference to FIG. 5. The shingles generated from the message 230 has the same character size n as the shingles generated from the reference document.

The total number of shingles in the message 230 is counted 726. In one embodiment, only unique shingles are counted and duplicative shingles are discarded from counting. If shingles in the message is denoted as "Y," the number of shingles in the message 230 may be expressed as S(Y), where S denotes a function for counting the number of unique shingles in a document. In another embodiment, all the shingles including duplicative shingles are counted. The number of all shingles in the message Y can be expressed S*(Y) where S* indicates a function for counting the number of all shingles.

The number matching unique shingles S(X∩Y) or common shingle count Count_Sum(X, Y) is computed 730. In one embodiment, the message processor 222 compares the shingles derived from the message with shingles stored as a set of reference data items in a trie data structure to compute the number of matching unique shingles S(X∩Y). Specifically, the message processor 222 reads a shingle in the message, and compares the characters of the shingle against entries in the nodes of the set of reference data items, starting from the first character at the first level. As the first character in the shingle matches a node in the first level of the trie data structure, the second character in the shingle is compared with a node in the second level of the trie data structure. The comparing for nodes at lower levels of the trie data structure is continued to check if all the characters in a shingle of the message match a shingle stored in the trie data structure. Taking the example of the set of reference data items 642A, if the first character of a shingle in the message does not correspond to "A" or "M," the shingle is determined as not corresponding to any shingles stored in the form of the set of reference data items 642A. If the first character in the shingle is "A," it is determined if the second character in the shingle is "C" or "N." If all the characters in the shingle matches with entries in the nodes of a trie structure, a count for matching shingle S(X∩Y) is incremented. All shingles in the message are compared with the entries in the set of reference data items to obtain a final count of S(X∩Y) for the message.

In another embodiment, the common shingle count represented as Count_Sum(X, Y) is computed for all unique shingles in the reference document. Count_Sum(X, Y) is the sum of Count(X, Y, i) for all i where i represents ith unique shingle appearing in the reference document. Count(X, Y, i) represents a smaller count of ith shingle appearing in the reference document X and the message Y. For example, if a first unique shingle (i=1) appears three times in the reference document X and five times in the message Y, the value of Count(X, Y, 1) is three (smaller of three and five). As another example, if a second unique shingle (i=2) appears five times in the reference document X and only once in the message Y, the value of Count(X, Y, 2) is one (smaller of five and one). Count_Sum(X, Y) is computed by adding up Count(X, Y, i) for all i.

Based on the results of the comparing the shingles of the message to the shingles derived from the reference document, a similarity index is computed 734. The similarity index (SI) represents the similarity between the message and the reference document. In one embodiment, the similarity index is computed by the following equation:

$$SI = \frac{S(X \cap Y)}{S(X \cup Y)} = \frac{S(X \cap Y)}{S(X) + S(Y) - S(X \cap Y)} \quad \text{equation (1)}$$

where S(X) represents the total number of unique shingles in the reference document, S(Y) represents the total number of unique shingles in the message, S(X∪Y) represents the total number of unique shingles in the reference document and the message, and S(X∩Y) represents the number of shingles in the message matching the shingles in the reference document.

In another embodiment, the similarity index SI* representing the similarity between the message and the reference document is computed by the following equation:

$$SI^* = \frac{\text{Count\_Sum}(X, Y)}{S^*(X) + S^*(Y) - \text{Count\_Sum}(X, Y)} \quad \text{equation (2)}$$

where S*(X) represents the total number of all shingles in the reference document (not discarding duplicative shingles), S*(Y) represents the total number of all shingles in the message (not discarding duplicative shingles) and Count_Sum(X, Y) represents the common shingle counts of the reference document X and the message Y.

In one embodiment, duplicative counts indicating the number of same shingles appearing in the same reference document are stored in the reference data store 218. The duplicative counts indicating the number of duplicative shingles are then considered in computing the similarity index.

In one embodiment, the message processor 222 sequentially obtains the similarity index SI or SI* for different sets of the reference data items. Specifically, if the similarity index SI or SI* for a set of reference data items is not above a threshold, the message processor 222 proceeds to the next set of reference data items to determine the similarity index for the next set of reference data items. The process of generating the similarity index is repeated until the similarity index for a set of reference data items exceeds a threshold. In another embodiment, the message processor 222 compares the shingles in the message with multiple sets of reference data items in parallel for increased speed. If any of the similarity indices exceeds a threshold, the message is determined to be similar to an unwanted message, and blocked from being routed, published or accessed.

In one embodiment, an aging algorithm is employed by the reference data manager 226 to classify the sets of reference data items into active and inactive sets of reference data items. For active sets of reference data items, all the messages may be screened for match while the inactive sets of reference data items are selectively compared against the message. For example, one in one thousand messages may be checked for similarity against the inactive sets of reference data items. If a message is determined to be similar to an inactive set of reference data items, the inactive set of reference data items may be reinstated to an active set of reference data item.

In one embodiment, there may be multiple levels of inactive sets of reference data items. As the level of priority decreases, the frequency of comparing the sets of reference data items against the message is progressively decreased. As the number of hits for a set of reference data item is increased, the set of reference data item may be moved to a higher priority group. In this way, the detection of unwanted messages may be performed more efficiently using less computational resources of the communication system 120.

In one embodiment, the reference data manager 226 tracks the similarity indexes and queues the messages that are close to the threshold for human review. Unwanted messages can mutate slowly and avoid detection by remaining within the similarity threshold. Once the unwanted messages avoid detection, the unwanted messages may quickly explode in volume. Hence, the messages that are close to the threshold are queued and presented for human review. If a human operator determines that the messages are unwanted messages, these messages are processed by the reference document processor 214 and stored in the reference data store 218 to prevent propagation of similar documents.

It is to be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable storage medium. Suitable computer-readable storage medium may include, among others, volatile (e.g., RAM) and/or non-volatile (e.g., ROM, disk) memory.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method comprising:
segmenting at least a portion of a reference document into a plurality of reference shingles, each reference shingle comprising a contiguous portion of the reference document that is of a predetermined length and shorter than the reference document, the plurality of reference shingles comprising a first series of reference shingles and a second series of reference shingles, the first series of reference shingles overlapping and having shifted starting locations relative to the second series of reference shingles;
storing the plurality of reference shingles in a trie structure and counts indicating a number of times each of the plurality of reference shingles comprising the first series of reference shingles and the second series of reference shingles appear in the plurality of reference shingles, a number of levels in the trie structure corresponding to a number of characters in each reference shingle;
segmenting at least a portion of a candidate document into a plurality of candidate shingles comprising a contiguous portion of the candidate document that is of the predetermined length and shorter than the candidate document;
determining a degree of matching between the stored reference shingles and the candidate shingles; and
computing a similarity index representing similarity between the reference document and the candidate document by an equation $$\frac{\text{Count\_Sum}(X, Y)}{S*(X) + S*(Y) - \text{Count\_Sum}(X, Y)}$$

where S*(X) represents a total number of the plurality of reference shingles, S*(Y) represents a total number of the plurality of candidate shingles, and Count_Sum(X, Y) represents a total number of shingles common in the plurality of reference shingles and the plurality of candidate shingles.

2. The method of claim 1, wherein the plurality of candidate shingles comprise a first series of candidate shingles and a second series of candidate shingles, the first series of candidate shingles overlapping and having shifted starting locations relative to the second series of candidate shingles.

3. The method of claim 1, wherein determining the degree of match comprises computing a number of the candidate shingles matching the reference shingles.

4. The method of claim 3, wherein computing the number comprises:
counting a number of candidate shingles matching one of the reference shingles; and
counting a number of the one of the reference shingles appearing in the reference document.

5. The method of claim 1, wherein the reference document is a communication identified as unwanted, and the candidate document is a communication to be transmitted via a communication channel.

6. A computer-implemented method comprising:
receiving a first reference document identified as unwanted;
receiving a communication transmitted through a communication channel;
segmenting at least a portion of the first reference document into a plurality of first reference shingles, each of the first reference shingles a contiguous portion of the first reference document that is of a predetermined length and shorter than the first reference document, the plurality of first reference shingles comprising a first series of reference shingles and a second series of reference shingles, the first series of reference shingles overlapping and having shifted starting locations relative to the second series of reference shingles;
storing the plurality of reference shingles in a trie structure and counts indicating a number of times each of the plurality of reference shingles comprising the first series of reference shingles and the second series of reference shingles appear in the plurality of reference shingles, a number of levels in the trie structure corresponding to a number of characters in each reference shingle;
segmenting at least a portion of the communication into a plurality of candidate shingles comprising a contiguous portion of the communication that is of the predetermined length and shorter than the communication;
determining a degree of matching between the first reference shingles and the candidate shingles;
computing a first similarity index by an equation $$\frac{\text{Count\_Sum}(X, Y)}{S*(X) + S*(Y) - \text{Count\_Sum}(X, Y)}$$

where $S*(X)$ represents a total number of the plurality of reference shingles, $S*(Y)$ represents a total number of the plurality of candidate shingles, and $\text{Count\_Sum}(X, Y)$ represents a total number of shingles common in the plurality of reference shingles and the plurality of candidate shingles;
determining whether the communication matches the first reference document based on the first similarity index; and
designating the communication to be blocked from further transmission through the communication channel responsive to determining that the communication matches the first reference document.

7. The method of claim 6, wherein the communication comprises an email, a web document, an instant message or a text message.

8. The method of claim 6, further comprising
receiving a second reference document identified as unwanted;
comparing the communication with second reference shingles associated with the second reference document to generate a second similarity index, the second similarity index representing similarity between the communication and the second reference document;
determining whether the communication matches the second reference document based on the second similarity index; and
designating the communication to be blocked from further transmission through the communication channel responsive to determining that the communication matches the second reference document.

9. The method of claim 6, further comprising:
computing frequency of a plurality of communications determined as matching the first reference document;
responsive to the frequency remaining above a frequency threshold, comparing all subsequent communications with the first reference document; and
responsive to the frequency not remaining above the frequency threshold, comparing a subset of subsequent communications with the first reference document.

10. The method of claim 9, further comprising resuming comparing the first reference document with all subsequent communications responsive to at least one communication in the subset of subsequent communications being determined as matching the first reference document.

11. The method of claim 6, further comprising determining whether to present the communication for manual review based on the first similarity index.

12. A communication system comprising:
a communication processor configured to compare a communication with a plurality of first reference shingles associated with a first reference document, the first reference document identified as unwanted and generate a first similarity index representing similarity between the communication and the first reference document, the communication processor configured to determine whether the communication matches the first reference document based on the first similarity index, the communication processor configured to designate the communication to be blocked from further transmission through a communication channel responsive to determining that the communication matches the first reference document based on the first similarity index, the communication processor further configured to:
segment at least a portion of the first reference document into a plurality of reference shingles, each of the first reference shingles comprising a contiguous portion of the first reference document that is of a predetermined length and shorter than the first reference document, the plurality of first reference shingles comprising a first series of reference shingles and a second series of reference shingles, the first series of reference shingles overlapping and having shifted starting locations relative to the second series of reference shingles;
store the plurality of reference shingles in a trie structure and counts indicating a number of times each of the plurality of reference shingles comprising the first series of reference shingles and the second series of reference shingles appear in the plurality of reference shingles, a number of levels in the trie structure corresponding to a number of characters in each reference shingle;
segment at least a portion of the communication into a plurality of candidate shingles comprising a contiguous portion of the communication that is of the predetermined length and shorter than the communication;
determine a degree of matching between the first reference shingles and the candidate shingles; and
compute the first similarity index by an equation $$\frac{\text{Count\_Sum}(X, Y)}{S*(X) + S*(Y) - \text{Count\_Sum}(X, Y)}$$

where $S*(X)$ represents a total number of the plurality of reference shingles, $S*(Y)$ represents a total number of the plurality of candidate shingles, and Count_Sum(X, Y) represents a total number of shingles common in the plurality of reference shingles and the plurality of candidate shingles; and
a communication module configured to receive communications to be transmitted and transmit the communication responsive to one or more recipients responsive to the communication not being blocked by the communication processor.

13. The communication system of claim 12, wherein the communication comprises an email, a web document, an instant message or a text message.

14. The communication system of claim 12, wherein the communication processor is further configured to:
compare a communication with second reference shingles associated with a second reference document, the second reference document identified as unwanted, to generate a second similarity index representing similarity between the communication and the second reference document;
determine whether the communication matches the second reference document based on the second similarity index; and
designate the communication to be blocked from further transmission through the communication channel responsive to determining that the communication matches the second reference document.

15. The communication system of claim 14, further comprising a reference data manager coupled to the communication processor and comprising a computer-readable storage medium storing instructions to:
compute frequency of a plurality of communications determined as matching the first reference document;
responsive to the frequency remaining above a frequency threshold, compare all subsequent communications with the first reference document; and
responsive to the frequency not remaining above the frequency threshold, compare a subset of subsequent communications with the first reference document.

16. The communication system of claim 15, wherein the reference data manager is configured to resume comparing the first reference document with all subsequent communications responsive to at least one communication in the subset of subsequent communications determined as matching the first reference document.

17. The communication system of claim 15, wherein the reference data manager is configured to determine whether to present the communication for manual review based on the first similarity index.

18. A non-transitory computer readable storage medium storing instructions, the instructions when executed by a processor, cause the processor to:
receive a first reference document identified as unwanted;
receive a communication to be routed or published in a communication channel controlled by the processor;
segment at least a portion of the first reference document into a plurality of first reference shingles, each of the first reference shingles comprising a contiguous portion of the first reference document that is of a predetermined length and shorter than the first reference document, the plurality of first reference shingles comprising a first series of reference shingles and a second series of reference shingles, the first series of reference shingles overlapping and having shifted starting locations relative to the second series of reference shingles;
store the plurality of reference shingles in a trie structure and counts indicating a number of times each of the plurality of reference shingles comprising the first series of reference shingles and the second series of reference shingles appear in the plurality of reference shingles, a number of levels in the trie structure corresponding to a number of characters in each reference shingle;
segment at least a portion of the communication into a plurality of candidate shingles comprising a contiguous portion of the communication that is of the predetermined length and shorter than the communication;
compute a first similarity index by an equation $$\frac{\text{Count\_Sum}(X, Y)}{S*(X) + S*(Y) - \text{Count\_Sum}(X, Y)}$$

where S*(X) represents a total number of the plurality of reference shingles, S*(Y) represents a total number of the plurality of candidate shingles, and Count_Sum(X, Y) represents a total number of shingles common in the plurality of reference shingles and the plurality of candidate shingles;
determine whether the communication matches the first reference document based on the first similarity index; and
designate the communication to be blocked from further transmission through the communication channel responsive to determining that the communication matches the first reference document.

19. A computer-implemented method comprising:
segmenting at least a portion of a reference document into a plurality of reference shingles, each reference shingle comprising a contiguous portion of the reference document that is of a predetermined length and shorter than the reference document;
storing the plurality of reference shingles in a trie structure and counts indicating a number of times each of the plurality of reference shingles comprising the first series of reference shingles and the second series of reference shingles appear in the plurality of reference shingles, a number of levels in the trie structure corresponding to a number of characters in each reference shingle;
segmenting at least a portion of a candidate document into a plurality of candidate shingles, each candidate shingle comprising a contiguous portion of the candidate document that is of the predetermined length and shorter than the candidate document, the plurality of candidate shingles comprising a first series of candidate shingles and a second series of candidate shingles, the first series of candidate shingles overlapping with and having shifted starting locations relative to the second series of candidate shingles;
determining a degree of matching between the reference shingles and the candidate shingles; and
computing a similarity index representing similarity between the reference document and the candidate document by an equation $$\frac{\text{Count\_Sum}(X, Y)}{S*(X) + S*(Y) - \text{Count\_Sum}(X, Y)}$$

where S*(X) represents a total number of the plurality of reference shingles, S*(Y) represents a total number of the plurality of candidate shingles, and Count_Sum(X, Y) represents a total number of shingles common in the plurality of reference shingles and the plurality of candidate shingles.

* * * * *